US011861515B2

(12) United States Patent
Erenrich et al.

(10) Patent No.: US 11,861,515 B2
(45) Date of Patent: Jan. 2, 2024

(54) SYSTEM AND METHOD FOR DETERMINING A PROPENSITY OF ENTITY TO TAKE A SPECIFIED ACTION

(71) Applicant: Palantir Technologies Inc., Denver, CO (US)

(72) Inventors: Daniel Erenrich, Mountain View, CA (US); Anirvan Mukherjee, Mountain View, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/961,822

(22) Filed: Oct. 7, 2022

(65) Prior Publication Data

US 2023/0034067 A1 Feb. 2, 2023

Related U.S. Application Data

(63) Continuation of application No. 15/689,757, filed on Aug. 29, 2017, now Pat. No. 11,521,096, which is a
(Continued)

(51) Int. Cl.
*G06N 5/048* (2023.01)
*G06Q 30/01* (2023.01)
(Continued)

(52) U.S. Cl.
CPC ......... *G06N 5/048* (2013.01); *G06F 16/2455* (2019.01); *G06N 7/01* (2023.01);
(Continued)

(58) Field of Classification Search
CPC ...... G06N 5/048; G06N 7/01; G06F 16/2455; G06Q 30/01; G06Q 30/0202; G06Q 30/02; G06Q 30/0201
See application file for complete search history.

(56) References Cited

U.S. PATENT DOCUMENTS 5,418,950 A 5/1995 Li et al.
5,428,737 A 6/1995 Li et al.
(Continued)

FOREIGN PATENT DOCUMENTS

CN 102054015 A 5/2011
CN 102546446 A 7/2012
(Continued)

OTHER PUBLICATIONS

"A Quick Guide to UniProtKB Swiss-Prot & TrEMBL," Sep. 2011, pp. 2.
(Continued)

*Primary Examiner* — Albert M Phillips, III
(74) *Attorney, Agent, or Firm* — Sheppard Mullin Richter & Hampton LLP

(57) ABSTRACT

Systems and methods are disclosed for determining a propensity of an entity to take a specified action. In accordance with one implementation, a method is provided for determining the propensity. The method includes, for example, accessing one or more data sources, the one or more data sources including information associated with the entity, forming a record associated with the entity by integrating the information from the one or more data sources, generating, based on the record, one or more features associated with the entity, processing the one or more features to determine the propensity of the entity to take the specified action, and outputting the propensity.

20 Claims, 6 Drawing Sheets

Related U.S. Application Data continuation of application No. 14/562,524, filed on Dec. 5, 2014, now abandoned.

(60) Provisional application No. 62/039,305, filed on Aug. 19, 2014, provisional application No. 62/027,761, filed on Jul. 22, 2014.

(51) Int. Cl.
*G06F 16/2455* (2019.01)
*G06Q 30/0202* (2023.01)
*G06N 7/00* (2023.01)
*G06Q 30/0201* (2023.01)
*G06N 7/01* (2023.01)

(52) U.S. Cl.
CPC ......... *G06Q 30/01* (2013.01); *G06Q 30/0202* (2013.01); *G06Q 30/0201* (2013.01)

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,430,305 B1 | 8/2002 | Decker |
| 6,643,613 B2 | 11/2003 | McGee et al. |
| 6,745,382 B1 | 6/2004 | Zothner |
| 6,820,135 B1 | 11/2004 | Dingman et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez, Jr. et al. |
| 6,978,419 B1 | 12/2005 | Kantrowitz |
| 6,980,984 B1 | 12/2005 | Huffman et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,168,039 B2 | 1/2007 | Bertram |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,617,232 B2 | 11/2009 | Gabbert et al. |
| 7,627,489 B2 | 12/2009 | Schaeffer et al. |
| 7,756,843 B1 | 7/2010 | Palmer |
| 7,783,679 B2 | 8/2010 | Bley |
| 7,853,573 B2 | 12/2010 | Warner et al. |
| 7,877,421 B2 | 1/2011 | Berger et al. |
| 7,899,796 B1 | 3/2011 | Borthwick et al. |
| 7,908,521 B2 | 3/2011 | Sridharan et al. |
| 7,917,376 B2 | 3/2011 | Bellin et al. |
| 7,941,321 B2 | 5/2011 | Greenstein et al. |
| 7,979,424 B2 | 7/2011 | Dettinger et al. |
| 8,036,971 B2 | 10/2011 | Aymeloglu et al. |
| 8,046,283 B2 | 10/2011 | Burns et al. |
| 8,054,756 B2 | 11/2011 | Chand et al. |
| 8,073,857 B2 | 12/2011 | Sreekanth |
| 8,103,962 B2 | 1/2012 | Embley et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,473,454 B2 | 6/2013 | Evanitsky et al. |
| 8,484,115 B2 | 7/2013 | Aymeloglu et al. |
| 8,499,287 B2 | 7/2013 | Shafi et al. |
| 8,560,494 B1 | 10/2013 | Downing et al. |
| 8,589,273 B2 | 11/2013 | Creeden et al. |
| 8,639,552 B1 | 1/2014 | Chen et al. |
| 8,688,573 B1 | 4/2014 | Rukonic et al. |
| 8,744,890 B1 | 6/2014 | Bernier et al. |
| 8,799,867 B1 | 8/2014 | Peri-Glass et al. |
| 8,812,960 B1 | 8/2014 | Sun et al. |
| 8,909,597 B2 | 12/2014 | Aymeloglu et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,935,201 B1 | 1/2015 | Fisher et al. |
| 8,938,686 B1 | 1/2015 | Erenrich et al. |
| 8,949,164 B1 | 2/2015 | Mohler |
| 9,031,981 B1 | 5/2015 | Potter et al. |
| 9,100,428 B1 | 8/2015 | Visbal |
| 9,105,000 B1 | 8/2015 | White et al. |
| 9,129,219 B1 | 9/2015 | Robertson et al. |
| 9,292,388 B2 | 3/2016 | Fisher et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0036848 A1 | 2/2003 | Sheha et al. |
| 2003/0105833 A1 | 6/2003 | Daniels |
| 2003/0126102 A1 | 7/2003 | Borthwick |
| 2003/0212670 A1 | 11/2003 | Yalamanchi et al. |
| 2004/0034570 A1 | 2/2004 | Davis |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0111480 A1 | 6/2004 | Yue |
| 2004/0126840 A1 | 7/2004 | Cheng et al. |
| 2004/0139212 A1 | 7/2004 | Mukherjee et al. |
| 2004/0153418 A1 | 8/2004 | Hanweck |
| 2004/0153837 A1 | 8/2004 | Preston et al. |
| 2004/0193608 A1 | 9/2004 | Gollapudi et al. |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0086207 A1 | 4/2005 | Heuer et al. |
| 2005/0120080 A1 | 6/2005 | Weinreb et al. |
| 2005/0154628 A1 | 7/2005 | Eckart et al. |
| 2005/0154769 A1 | 7/2005 | Eckart et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0026120 A1 | 2/2006 | Carolan et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0209085 A1 | 9/2006 | Wong et al. |
| 2006/0271884 A1 | 11/2006 | Hurst |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0011304 A1 | 1/2007 | Error |

(56) References Cited

U.S. PATENT DOCUMENTS

| | | |
|---|---|---|
| 2007/0027851 A1 | 2/2007 | Kruy et al. |
| 2007/0038646 A1 | 2/2007 | Thota |
| 2007/0094248 A1 | 4/2007 | McVeigh et al. |
| 2007/0113164 A1 | 5/2007 | Hansen et al. |
| 2007/0150801 A1 | 6/2007 | Chidlovskii et al. |
| 2007/0150805 A1 | 6/2007 | Misovski |
| 2007/0156673 A1 | 7/2007 | Maga |
| 2007/0168336 A1 | 7/2007 | Ransil et al. |
| 2007/0178501 A1 | 8/2007 | Rabinowitz et al. |
| 2007/0185867 A1 | 8/2007 | Maga et al. |
| 2007/0192281 A1 | 8/2007 | Cradick et al. |
| 2007/0260582 A1 | 11/2007 | Liang |
| 2007/0284433 A1 | 12/2007 | Domenica et al. |
| 2008/0040275 A1 | 2/2008 | Paulsen et al. |
| 2008/0069081 A1 | 3/2008 | Chand et al. |
| 2008/0103996 A1 | 5/2008 | Forman et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0267386 A1 | 10/2008 | Cooper |
| 2008/0313132 A1 | 12/2008 | Hao et al. |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0094166 A1 | 4/2009 | Aymeloglu et al. |
| 2009/0094217 A1 | 4/2009 | Dettinger et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0249244 A1 | 10/2009 | Robinson et al. |
| 2009/0271343 A1 | 10/2009 | Vaiciulis et al. |
| 2009/0282068 A1 | 11/2009 | Shockro et al. |
| 2009/0299830 A1 | 12/2009 | West et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070464 A1 | 3/2010 | Aymeloglu et al. |
| 2010/0070842 A1 | 3/2010 | Aymeloglu et al. |
| 2010/0073315 A1 | 3/2010 | Lee et al. |
| 2010/0082671 A1 | 4/2010 | Li et al. |
| 2010/0098318 A1 | 4/2010 | Anderson |
| 2010/0114887 A1 | 5/2010 | Conway et al. |
| 2010/0131502 A1 | 5/2010 | Fordham |
| 2010/0145902 A1 | 6/2010 | Boyan et al. |
| 2010/0161646 A1 | 6/2010 | Ceballos et al. |
| 2010/0161735 A1 | 6/2010 | Sharma |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0199167 A1 | 8/2010 | Uematsu et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2010/0313119 A1 | 12/2010 | Baldwin et al. |
| 2011/0004498 A1 | 1/2011 | Readshaw |
| 2011/0035396 A1 | 2/2011 | Merz et al. |
| 2011/0041084 A1 | 2/2011 | Karam |
| 2011/0061013 A1 | 3/2011 | Bilicki et al. |
| 2011/0066497 A1 | 3/2011 | Gopinath et al. |
| 2011/0074811 A1 | 3/2011 | Hanson et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0131547 A1 | 6/2011 | Elaasar |
| 2011/0145401 A1 | 6/2011 | Westlake |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0213655 A1 | 9/2011 | Henkin et al. |
| 2011/0218955 A1 | 9/2011 | Tang et al. |
| 2011/0252282 A1 | 10/2011 | Meek et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0102022 A1 | 4/2012 | Miranker et al. |
| 2012/0131512 A1 | 5/2012 | Takeuchi et al. |
| 2012/0159362 A1 | 6/2012 | Brown et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0284719 A1 | 11/2012 | Phan et al. |
| 2012/0323888 A1 | 12/2012 | Osann, Jr. |
| 2013/0016106 A1 | 1/2013 | Yip et al. |
| 2013/0024268 A1 | 1/2013 | Manickavelu |
| 2013/0024731 A1 | 1/2013 | Shochat et al. |
| 2013/0054306 A1 | 2/2013 | Bhalla et al. |
| 2013/0054551 A1 | 2/2013 | Lange |
| 2013/0057551 A1 | 3/2013 | Ebert et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-Yaniv et al. |
| 2013/0198624 A1 | 8/2013 | Aymeloglu et al. |
| 2013/0225212 A1 | 8/2013 | Khan |
| 2013/0226318 A1 | 8/2013 | Procyk et al. |
| 2013/0226944 A1 | 8/2013 | Baid et al. |
| 2013/0232220 A1 | 9/2013 | Sampson |
| 2013/0238616 A1 | 9/2013 | Rose et al. |
| 2013/0246170 A1 | 9/2013 | Gross et al. |
| 2013/0246537 A1 | 9/2013 | Gaddala |

(56) References Cited

U.S. PATENT DOCUMENTS

| | | |
|---|---|---|
| 2013/0246597 A1 | 9/2013 | Iizawa et al. |
| 2013/0208565 A1 | 10/2013 | Castellanos et al. |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2014/0012796 A1 | 1/2014 | Petersen et al. |
| 2014/0012886 A1 | 1/2014 | Downing et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0074888 A1 | 3/2014 | Potter et al. |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0112641 A1 | 4/2015 | Faraj |
| 2015/0135256 A1 | 5/2015 | Hoy et al. |
| 2015/0188872 A1 | 7/2015 | White |
| 2015/0269030 A1 | 9/2015 | Fisher et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055501 A1 | 2/2016 | Mukherjee et al. |

FOREIGN PATENT DOCUMENTS

| | | |
|---|---|---|
| CN | 103167093 A | 6/2013 |
| DE | 102014103482 A1 | 9/2014 |
| DE | 102014204827 A1 | 9/2014 |
| DE | 102014204830 A1 | 9/2014 |
| DE | 102014204834 A1 | 9/2014 |
| EP | 1647908 A2 | 4/2006 |
| EP | 2487610 A2 | 8/2012 |
| EP | 2634745 A1 | 9/2013 |
| EP | 2743839 A1 | 6/2014 |
| EP | 2778986 A1 | 9/2014 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2921975 A1 | 9/2015 |
| EP | 2963595 A1 | 1/2016 |
| EP | 2988258 A1 | 2/2016 |
| GB | 2366498 A | 3/2002 |
| GB | 2508293 A | 5/2014 |
| GB | 2508503 A | 6/2014 |
| HK | 1194178 A1 | 10/2014 |
| NZ | 622485 A | 11/2014 |
| NZ | 616212 A | 1/2015 |
| NZ | 616299 A | 4/2015 |
| WO | 0034895 A1 | 6/2000 |
| WO | 2005116851 A2 | 12/2005 |
| WO | 2010030917 A2 | 3/2010 |
| WO | 2013030595 A1 | 3/2013 |

OTHER PUBLICATIONS

"A Tour of Pinboard," <http://pinboard.in/tour> as printed May 15, 2014 in 6 pages.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"The FASTA Program Package," fasta-36.3.4, Mar. 25, 2011, pp. 29.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Anonymous, "Frequently Asked Questions about Office Binder 97," http://web.archive.org/web/20100210112922/http://support.microsoft.com/kb/843147 printed Dec. 18, 2006 in 5 pages.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Chazelle et al., "The Bloomier Filter: An Efficient Data Structure for Static Support Lookup Tables," SODA Ô04 Proceedings of the Fifteenth Annual ACM-SIAM Symposium on Discrete Algorithms, 2004, pp. 30-39.

Cohn et al., "Semi-supervised Clustering with User Feedback," Constrained Clustering: Advances in Algorithms, Theory, and Applications 4.1, 2003, pp. 17-32.

(56) References Cited

OTHER PUBLICATIONS

Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
DISTIMO—App Analytics, <http://www.distimo.com/app-analytics> Printed Jul. 18, 2013 in 5 pages.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Flurry Analytics, <http://www.flurry.com/> Printed Jul. 18, 2013 in 14 pages.
Goldstein et al., "Stacks Lazy Threads: Implementing a Fast Parallel Call," Journal of Parallel and Distributed Computing, Jan. 1, 1996, pp. 5-20.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Han et al., "Efficient Computation of Iceberg Cubes with Complex Measures," ACM Sigmod, May 21-24, 2001, pp. 1-12.
Hansen et al. "Analyzing Social Media Networks with NodeXL: Insights from a Connected World", Chapter 4, pp. 53-67 and Chapter 10, pp. 143-164, published Sep. 2010.
Hatwar, Windows 8—style UI overtakes GUI, pp. 1-3, 2012.
Hua et al., "A Multi-attribute Data Structure with Parallel Bloom Filters for Network Services", HiPC 2006, LNCS 4297, pp. 277-288, 2006.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Official Communication for U.S. Appl. No. 14/306,147 dated Dec. 24, 2015.
Official Communication for U.S. Appl. No. 14/306,147 dated Mar. 4, 2016.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Mendes et al., "TcruziKB: Enabling Complex Queries for Genomic Data Exploration," IEEE International Conference on Semantic Computing, Aug. 2008, pp. 432-439.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Notice of Acceptance for New Zealand Patent Application No. 616212 dated Jan. 23, 2015.
Notice of Acceptance for New Zealand Patent Application No. 616299 dated Apr. 7, 2015.
Notice of Acceptance for New Zealand Patent Application No. 622485 dated Nov. 24, 2014.
Notice of Allowance for U.S. Appl. No. 13/411,291 dated Apr. 22, 2016.
Notice of Allowance for U.S. Appl. No. 13/657,635 dated Jan. 29, 2016.
Notice of Allowance for U.S. Appl. No. 13/657,656 dated May 10, 2016.
Notice of Allowance for U.S. Appl. No. 13/767,779 dated Mar. 17, 2015.
Notice of Allowance for U.S. Appl. No. 13/827,627 dated Apr. 11, 2016.
Notice of Allowance for U.S. Appl. No. 14/019,534 dated Feb. 4, 2016.
Notice of Allowance for U.S. Appl. No. 14/225,084 dated May 4, 2015.
Notice of Allowance for U.S. Appl. No. 14/254,757 dated Sep. 10, 2014.
Notice of Allowance for U.S. Appl. No. 14/254,773 dated Aug. 20, 2014.
Notice of Allowance for U.S. Appl. No. 14/304,741 dated Apr. 7, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/581,902 dated Nov. 13, 2015.
Notice of Allowance for U.S. Appl. No. 14/746,671 dated Jan. 21, 2016.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2807899 dated Jul. 20, 2015.
Official Communication for Canadian Patent Application No. 2807899 dated Oct. 24, 2014.
Official Communication for Canadian Patent Application No. 2828264 dated Apr. 11, 2016.

(56) References Cited

OTHER PUBLICATIONS

Official Communication for Canadian Patent Application No. 2828264 dated Apr. 28, 2015.
Official Communication for Canadian Patent Application No. 2829266 dated Apr. 1, 2016.
Official Communication for Canadian Patent Application No. 2829266 dated Apr. 28, 2015.
Official Communication for Canadian Patent Application No. 2929264 dated Apr. 11, 2016.
Official Communication for European Patent Application No. 13157474.1 dated Oct. 30, 2015.
Official Communication for European Patent Application No. 14159175.0 dated Jul. 17, 2014.
Official Communication for European Patent Application No. 14159175.0 dated Feb. 4, 2016.
Official Communication for European Patent Application No. 14159464.8 dated Feb. 18, 2016.
Official Communication for European Patent Application No. 14159629.6 dated Sep. 22, 2014.
Official Communication for European Patent Application No. 14159629.6 dated Jul. 31, 2014.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15159520.4 dated Jul. 15, 2015.
Official Communication for European Patent Application No. 15181419.1 dated Sep. 29, 2015.
Official Communication for European Patent Application No. 15184764.7 dated Dec. 14, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Great Britain Patent Application No. 1404574.4 dated Dec. 18, 2014.
Official Communication for Netherlands Patent Application 2012438 dated Sep. 21, 2015.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patents Application No. 2012417 dated Sep. 18, 2015.
Official Communication for Netherlands Patents Application No. 2012421 dated Sep. 18, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622484 dated Apr. 2, 2014.
Official Communication for New Zealand Patent Application No. 622485 dated Nov. 21, 2014.
Official Communication for New Zealand Patent Application No. 622513 dated Apr. 3, 2014.
Official Communication for New Zealand Patent Application No. 628161 dated Aug. 25, 2014.
Official Communication for United Kingdom Patent Application No. 1404486.1 dated Aug. 27, 2014.
Official Communication for United Kingdom Patent Application No. 1404489.5 dated Aug. 27, 2014.
Official Communication for United Kingdom Patent Application No. 1404489.5 dated Oct. 6, 2014.
Official Communication for United Kingdom Patent Application No. 1404499.4 dated Aug. 20, 2014.
Official Communication for United Kingdom Patent Application No. 1404499.4 dated Sep. 29, 2014.
Official Communication for U.S. Appl. No. 13/411,291 dated Oct. 1, 2015.
Official Communication for U.S. Appl. No. 13/411,291 dated Jul. 15, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/827,627 dated Aug. 26, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/676,621 dated Jul. 30, 2015.

(56) References Cited

OTHER PUBLICATIONS

Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/877,229 dated Mar. 22, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Russell et al., "NITELIGHT: A Graphical Tool for Semantic Query Construction," 2008, pp. 10.
Sigrist et al., "PROSITE, a Protein Domain Database for Functional Characterization and Annotation," Nucleic Acids Research 38.Suppl 1, 2010, pp. D161-D166.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), ÈAcitrezza, Catania, Italy, Sep. Ê29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
StatCounter—Free Invisible Web Tracker, Hit Counter and Web Stats, <http://statcounter.com/> Printed Jul. 19, 2013 In 17 pages.
TestFlight—Beta Testing On The Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Machine Code", p. 1-5, printed Aug. 11, 2014.
Wikipedia, "Multimap," Jan. 1, 2013, https://en.wikipedia.org/w/index.php?title=Multimap&oldid=530800748.
Wollrath et al., "A Distributed Object Model for the Java System," Proceedings of the 2nd Conference on USENEX, Conference on Object-Oriented Technologies (COOTS), Jun. 17, 1996, pp. 219-231.

500

INBOX  FLAGGED  STATS

John Smith
Triage Agent

| FEB 21, 2014 | MED | FEB 20, 2014 | HIGH | FEB 18, 2014 | MED |
|---|---|---|---|---|---|
| Agent called customer on 2/21 regarding discounts | | Customer deactivated ETF payment on 2/20. | | Customer registered an additional luxury vehicle on 2/18. | |
| Vehicle  Service Call  Discounts  Policy #59372834 | | Vehicle  Payments  Policy #94728364 | | Vehicle  Activity  Policy #34726102 | |

| FEB 17, 2014 | LOW | FEB 14, 2014 | MED | FEB 14, 2014 | MED |
|---|---|---|---|---|---|
| Customer called Service Ops regarding a total loss on vehicle. | | Second consecutive late payment received. | | Customer filed a claim on 2/14. | |
| Vehicle  Service Call  Claims  Policy #23671283 | | Vehicle  Payments  Policy #47393083 | | Vehicle  Claims  Policy #74103843 | |

| FEB 13, 2014 | MED | FEB 10, 2014 | LOW | FEB 5, 2014 | LOW |
|---|---|---|---|---|---|
| Customer contacted agent on 2/13 to discuss deductible options. | | Agent to follow up on change in customer's credit score. | | Agent called customer on 2/5 to discuss deductible options. | |
| Vehicle  Service Call  Policy #12937468 | | Vehicle  Activity  Policy #94873624 | | Vehicle  Service Call  Policy #33892723 | |

| FEB 18, 2014 — 610 | 620 — MED | ACTIVE — 630 | 600 |
|---|---|---|---|

640 — Customer registered an additional luxury vehicle on 2/18.

650 — Vehicle Service Call

660 —
Policy #34726182

OWNER: David Stark
COVERED SINCE: 12/12/2004
OWNER: James Watson
VEHICLE: 2013 Cadillac Escalade
POLICY TYPE: Standard

670 —
Agent Info

FULL NAME: Bruce Atherton
PHONE: (583) 234 9172
EMAIL: batherton@abci.com

680 —
You marked this item as active.

Bruce Atherton: Hmm, didn't catch this - I'll give David a call ASAP.

You: Sounds good.

Bruce Atherton called David Stark.

690 — ADD AN UPDATE

FIG. 6

SYSTEM AND METHOD FOR DETERMINING A PROPENSITY OF ENTITY TO TAKE A SPECIFIED ACTION

CROSS REFERENCE TO RELATED APPLICATIONS

This application is a continuation application of U.S. patent application Ser. No. 15/689,757, filed on Aug. 29, 2017, now U.S. Pat. No. 11,521,096, which is a continuation application of U.S. patent application Ser. No. 14/562,524, filed on Dec. 5, 2014, which claims priority to U.S. Provisional Patent Application No. 62/027,761, filed on Jul. 22, 2014, and U.S. Provisional Patent Application No. 62/039,305, filed on Aug. 19, 2014, the disclosures of which are expressly incorporated herein by reference in their entirety.

BACKGROUND

The amount of information being processed and stored is rapidly increasing as technology advances present an ever-increasing ability to generate and store data. On the one hand, this vast amount of data allows entities to perform more detailed analyses than ever. But on the other hand, the vast amount of data makes it more difficult for entities to quickly sort through and determine the most relevant features of the data. Collecting, classifying, and analyzing large sets of data in an appropriate manner allows these entities to more quickly and efficiently identify patterns, thereby allowing them to predict future actions.

BRIEF DESCRIPTION OF THE DRAWINGS

Reference will now be made to the accompanying drawings, which illustrate exemplary embodiments of the present disclosure. In the drawings:

FIG. 5 illustrates an exemplary user interface, consistent with embodiments of the present disclosure; and FIG. 6 illustrates another exemplary user interface, consistent with embodiments of the present disclosure.

DETAILED DESCRIPTION OF EXEMPLARY EMBODIMENTS

Figure 1:
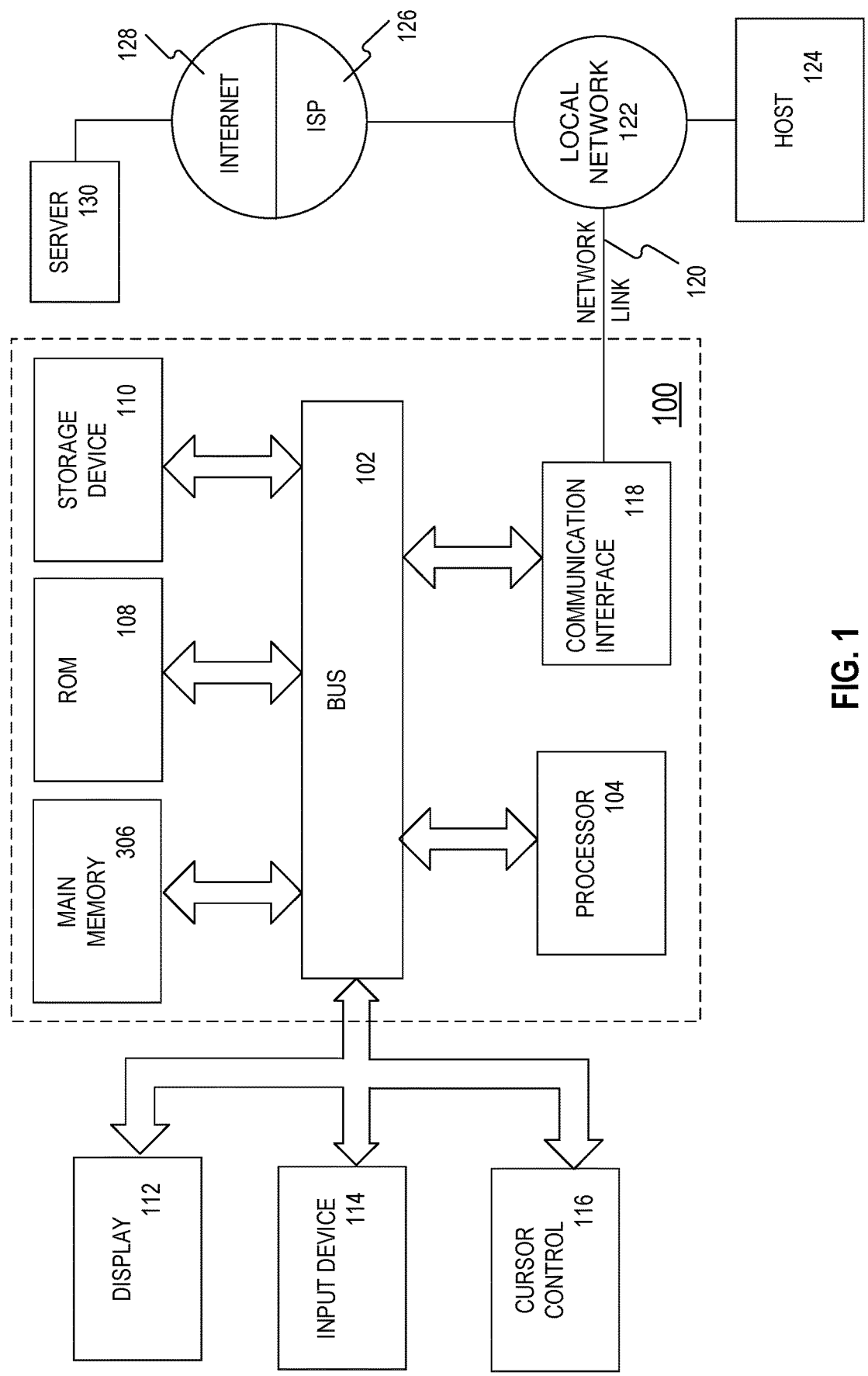
FIG. 1 is a block diagram of an exemplary computer system, consistent with embodiments of the present disclosure.

Reference will now be made in detail to several exemplary embodiments, including those illustrated in the accompanying drawings. Whenever possible, the same reference numbers will be used throughout the drawings to refer to the same or like parts.

Embodiments disclosed herein are directed to, among other things, to systems and methods that can determine the propensity of an entity (e.g., a person, a household, or a company) to take a specified action. For example, a specific action can involve determining the propensity that a customer will leave a supplier during a given time period (e.g., churn). Such factors that can affect the churn rate include customer dissatisfaction, cheaper and/or better offers from the competition, more successful sales and/or marketing by the competition, or reasons having to do with the customer life cycle. If a supplier can receive an indication that a customer is likely to churn, the supplier can take one or more actions in order to keep the customer. The embodiments disclosed herein can assist with providing that indication.

For example, the systems and methods can access one or more data sources, the one or more data sources including information associated with the entity, form a record associated with the entity by integrating the information from the one or more data sources, generate, based on the record, one or more features associated with the entity, process the one or more features to determine the propensity of the entity to take the specified action, and output the propensity.

The operations, techniques, and/or components described herein are implemented by a computer system, which can include one or more special-purpose computing devices. The special-purpose computing devices can be hard-wired to perform the operations, techniques, and/or components described herein. The special-purpose computing devices can include digital electronic devices such as one or more application-specific integrated circuits (ASICs) or field programmable gate arrays (FPGAs) that are persistently programmed to perform the operations, techniques, and/or components described herein. The special-purpose computing devices can include one or more hardware processors programmed to perform such features of the present disclosure pursuant to program instructions in firmware, memory, other storage, or a combination. Such special-purpose computing devices can combine custom hard-wired logic, ASICs, or FPGAs with custom programming to accomplish the techniques and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

By way of example, FIG. 1 is a block diagram that illustrates an implementation of a computer system 100, which, as described above, can comprise one or more electronic devices. Computer system 100 includes a bus 102 or other communication mechanism for communicating information, and one or more hardware processors 104 (denoted as processor 104 for purposes of simplicity), coupled with bus 102 for processing information. One or more hardware processors 104 can be, for example, one or more microprocessors.

Computer system 100 also includes a main memory 106, such as a random access memory (RAM) or other dynamic storage device, coupled to bus 102 for storing information and instructions to be executed by one or more processors 104. Main memory 106 also can be used for storing temporary variables or other intermediate information during execution of instructions to be executed by processor 104. Such instructions, when stored in non-transitory storage media accessible to one or more processors 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to one or more processors 104. Another type of user input device is cursor control 116, such as a mouse, a trackball, or cursor direction keys for communicating direction information and command selections to one or more processors 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 100 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computer system 100 can implement the techniques and other features described herein using customized hard-wired logic, one or more ASICs or FPGAs, firmware and/or program logic which in combination with the electronic device causes or programs computer system 100 to be a special-purpose machine. According to some embodiments, the techniques and other features described herein are performed by computer system 100 in response to one or more processors 104 executing one or more sequences of one or more instructions contained in main memory 106. Such instructions can be read into main memory 106 from another storage medium, such as storage device 110. Execution of the sequences of instructions contained in main memory 106 causes one or more processors 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, a register memory, a processor cache, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to one or more processors 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by one or more processors 104.

Computer system 100 can also include a communication interface 118 coupled to bus 102. Communication interface 118 can provide a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic, or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic, or optical signals that carry digital data streams. The signals through the various networks and the signals on network link 120 and through communication interface 118, which carry the digital data to and from electronic device 110, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code can be executed by one or more processors 104 as it is received, and/or stored in storage device 110, or other non-volatile storage for later execution.

Figure 2:
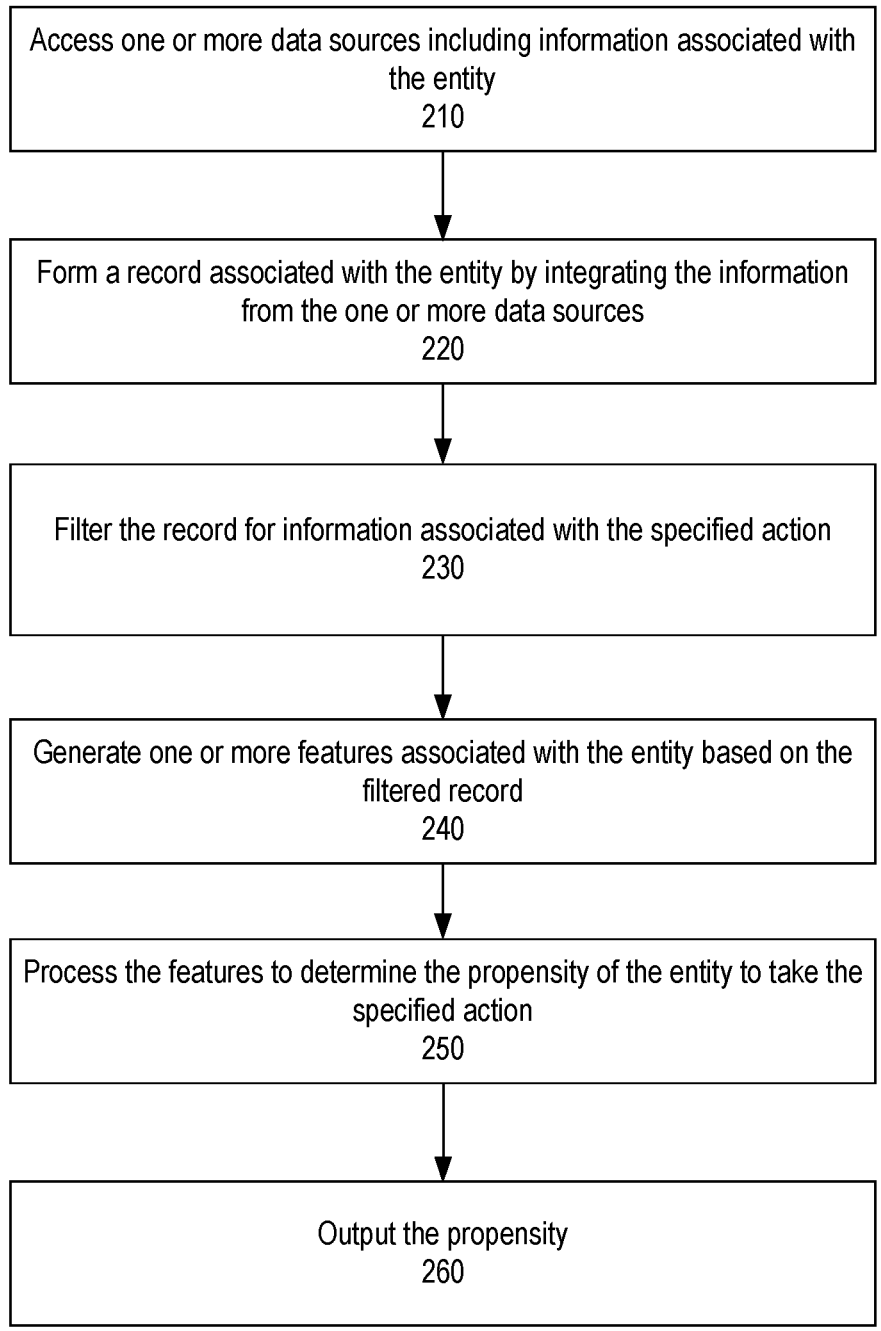
FIG. 2 is a flowchart of an exemplary method for determining a propensity of an entity to take a specified action, consistent with embodiments of the present disclosure.

FIG. 2 is a flowchart representing an exemplary method 200 for determining the propensity of an entity to take a specified action. While the flowchart discloses the following steps in a particular order, it is appreciated that at least some of the steps can be moved, modified, or deleted where appropriate, consistent with embodiments of the present disclosure. In some embodiments, method 200 can be performed in full or in part by a computer system (e.g., computer system 100). It is appreciated that some of these steps can be performed in full or in part by other systems.

Referring to FIG. 2, at step 210, the computer system can access one or more data sources that include information associated with the entity. The one or more data sources can be stored locally at the computer system and/or at one or more remote servers (e.g., such as a remote database), or at one or more other remote devices. In some embodiments, the information in the data sources can be stored in one or more multidimensional tables. By way of example, information of a first type (e.g., bill payment amount) associated with the entity, (e.g., a household), can be stored in a first multidimensional table and information of a second type (e.g., automobile type) associated with the entity can be stored in a second multidimensional table. In some embodiments a table can contain information associated with a single entity. In other embodiments, a table can store information associated with a plurality of entities. For example, each row in the table can correspond to a different entity (e.g., Household #1, Household #2, etc.) and each column in the table can correspond to a payment amount. In some embodiments, the information stored in the table can include entries associated with a temporal period. For example, a table can store a bill payment date for each bill payment amount. The information can be stored as a continuous value (e.g., $800 as a bill payment amount), as a categorical value (e.g., "Sedan" or "Coupe" as an automobile type), as textual value, or as any other type of value. In some embodiments, a table can be stored in either a row-oriented database or a column-oriented database. For example, a row in a row-oriented table can contain information associated with an entity (e.g., Household #1) and data in the row can be stored serially such that information associated with the entity can be accessed in one operation.

In some embodiments the computer system can access the one or more data sources periodically (e.g., once a week, once a month, etc.). The computer system can access the one or more data sources based on the one or more data sources being updated (e.g., a new entry, such as payment bill amount, is added to a table). In some embodiments, the computer system can access the one or more data sources responsive to an input received from the user. The user input can identify the entity (e.g. Household #5) for which information is requested. In some embodiments, the user input can identify a category or class of entities. For example, the user input can identify a class of entities that are all consumers of a specified provisioning entity (e.g., insurance company), the user input can identify entities that are located within a specified geographic region (e.g., all households within the state of Illinois), or the user input can identify any other category of entities (e.g., all households with an income over $100,000). In response to the user input, the computer system can access the one or more data sources including information associated with the entities. In some embodiments, method 200 can be performed periodically (e.g., once a week, once a month, etc.). In some embodiments, method 200 can be performed whenever the one or more data sources are accessed.

At step 220, the computer system can form a record including all information from the one or more data sources associated with the entity. In some embodiments, the record can be formed by integrating the information that is associated with the entity from the one or more data sources. The record can contain a multitude of information related to the entity. For example, the record can contain all information from the one or more data sources associated with a household (e.g., number of members in household, age of each member of the household, number of automobiles, income, monthly bill mounts for each automobile, types of automobiles, etc.). In some embodiments, the record can be stored as a cogroup (e.g., the cogroup shown in FIG. 4). In some embodiments, the record can be stored in either a row-oriented database or a column-oriented database. For example, a row in a row-oriented record can be associated with a data source (e.g., bill payment amount) and data in the row can be stored serially such that data associated with that data source can be accessed in one operation.

At step 230, the computer system can filter the record for information associated with the specified action. For example, the specified action can be churn (e.g., cancellation of a subscription) and the computer system can filter the record for information related to churn. In some embodiments, the computer system can provide context for the specified action. In some embodiments, the computer system can determine whether the specified action will likely occur within a specified temporal period (e.g., one month). The computer system can filter out all information associated with a time that is outside (e.g., before or after) the specified temporal period. In some embodiments, the computer system can determine the propensity for the specified action based on only recent events. For example, the computer system can filter out information associated with a time before the specified time period (e.g., stale or less relevant information). In some embodiments, each record can be filtered in a slightly different way. The record can be filtered according to a user input specifying an activity or temporal period. In some embodiments, the record can be filtered automatically based on a presetting (e.g., the computer can be configured to filter out all information that is more than one year old).

At step 240, the computer system can generate, based on the record, one or more features associated with the entity. A feature can be any discernable way of sorting or classifying the record (e.g., average value, most recent value, most common value, etc.). In some embodiments, the computer system can generate key value pairs, wherein each key value pair contains a feature and a value. For example, the computer system can generate features such as "average bill payment amount", "average income", "average number of automobiles", etc. and corresponding values such as "$670", "$73K", "2.3 cars", etc. In some embodiments, features can be associated with a time value. For example, computer system can generate features for a specified temporal period (e.g., features can be based only on the most recent values). Feature values can be represented as a continuous value (e.g., $670), as a categorical value (e.g., "Sedan" or "Coupe"), as a textual value, or as any other type of value. In some embodiments, feature values can be classified as weighted values. For example, a household income of $73,000 can be represented as weighted value of {0.27 0}, {0.73 100000}.

At step 250, the computer system can process the one or more features to determine the propensity of the entity to take the specified action. In some embodiments, the propensity can be determined by applying a trained model, such as the model described in greater detail in FIG. 3. The input to the model can be key value pairs of the one or more features associated with the entity and the specified actions and the output of the model can be the propensity of the entity to take the specified action. In some embodiments, processing the one or more features associated with the entity can result in a multitude of useful insights regarding the features that influence the propensity of the entity to take the specified action. Such insights, can include, for example, the features that are most influential on the propensity of the entity to take the specified action (e.g., change in income, etc.).

At step 260, the computer system can output the propensity. In some embodiments the computer system can output the propensity as a continuous value, such as a number or percentage (e.g., 80 or 80%) or as a categorical value (e.g., "low", "medium", or "high"). In some embodiments, the computer system can generate a user interface, such as the user interfaces described in greater detail in FIGS. 5 and 6 for displaying the propensity. In some embodiments, the computer system can output a plurality of propensities for a plurality of entities. The computer system can output the plurality of propensities as an a separate file (e.g., a text file or an Excel file) or as a table.

Figure 3:
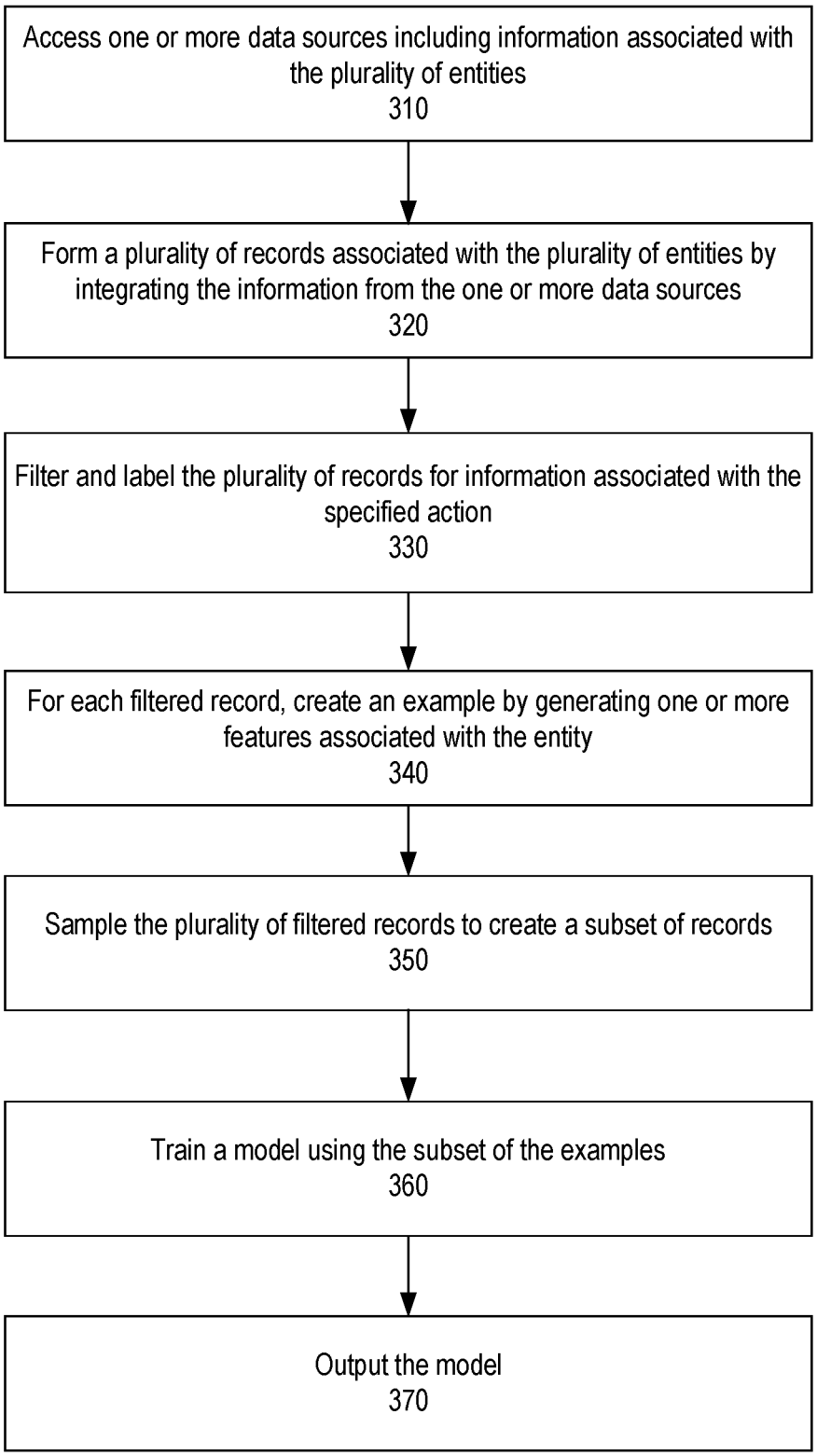
FIG. 3 is a flowchart of an exemplary method for creating a model to determine the propensity of an entity to take a specified action, consistent with embodiments of the present disclosure.

FIG. 3 shows a flowchart representing an exemplary method 300 for creating a model to determine the propensity of an entity to take a specified action, consistent with embodiments of the present disclosure. While the flowchart discloses the following steps in a particular order, it is appreciated that at least some of the steps can be moved, modified, or deleted where appropriate, consistent with embodiments of the present disclosure. In some embodiments, method 300 can be performed in full or in part by a computer system (e.g., computer system 100). It is appreciated that some of these steps can be performed in full or in part by other systems.

Referring to FIG. 3, at step 310, the computer system can access one or more data sources that include information associated with the plurality of entities. The one or more data sources can be stored locally at the computer system and/or at one or more remote servers (e.g., such as a remote database), or at one or more other remote devices. In some embodiments, the information in the data sources can be stored in one or more multidimensional tables. By way of example, information of a first type (e.g., bill payment amount) associated with the plurality of entities, (e.g., households), can be stored in a first multidimensional table and information of a second type (e.g., automobile type) associated with the entities can be stored in a second multidimensional table. In some embodiments a plurality of table can contain information associated with the plurality of entities, wherein each table contains information associated with each entity. In other embodiments, a table can store information associated with a plurality of entities. For example, each row in the table can correspond to a different entity (e.g., Household #1, Household #2, etc.) and each column in the table can correspond to a payment amount. In some embodiments, the information stored in a table can include entries associated with a temporal period. For example, a table can store a bill payment date for each bill payment amount. The information can be stored as a continuous value (e.g., $800 as a bill payment amount), as a categorical value, (e.g., "Sedan" or "Coupe" as an automobile type), as textual value, or as any other type of value. In some embodiments, a table can be stored in either a row-oriented database or a column-oriented database. For example, a row in a row-oriented table can contain information associated with an entity (e.g., Household #1) and data in the row can be stored serially such that information associated with the entity can be accessed in one operation.

In some embodiments the computer system can access the one or more data sources periodically (e.g., once a week, once a month, etc.). In other embodiments, the computer system can access the one or more data sources based on the one or more data sources being updated (e.g., a new entry, such as payment bill amount, is added to a table). In some embodiments, the computer system can access the one or more data sources responsive to an input received from the user. In some embodiments, the user input can specifically identify the plurality of entities (e.g., Household #1-#10,000) for use in generating the model. In some embodiments, the user input can identify a category or class of entities. For example, the user input can identify a class of entities that are all consumers of a specified provisioning entity (e.g., insurance company), the user input can identify entities that are located within a specified geographic region (e.g., all households within the state of Illinois), or the user input can identify any other category of entities (e.g., all households with an income over $100,000). In response to a user input, the computer system can access the one or more data sources including information associated with the plurality of entities.

At step 320, the computer system can form a plurality of records including information from the one or more data sources associated with the plurality of entities, each record being associated with an entity. In some embodiments, a record of the plurality of records can be formed by integrating information from the one or more data sources information that is associated with an entity of the plurality of entities. The record can contain a multitude of information related to the entity. For example, the record can contain all information from the one or more data sources associated with a household (e.g., number of members in household, number of automobiles, income, monthly bill amounts for each automobile, etc.). In some embodiments, the record can be stored as a cogroup (e.g., the cogroup shown in FIG. 4). In some embodiments, the record can be stored in either a row-oriented database or a column-oriented database. For example, a row in a record can be associated with a data source (e.g., bill payment amount) and data in the row can be stored serially such that data associated with that data source can be accessed in one operation.

At step 330, the computer system can filter the plurality of records for information associated with the specified action. For example, the specified action can be churn (e.g., cancellation or non-renewal of a subscription) and the computer system can filter the record for information related to churn. In some embodiments, the computer system can provide context for (e.g., frame) the specified action. In some embodiments, the computer system can determine whether the specified action will occur within a specified temporal period (e.g., one month). The computer system can filter out all information associated with a time that is outside (e.g., before or after) the specified temporal period. In some embodiments, the computer system can determine the propensity for the specified action based on only recent information. For example, the computer system can filter out information associated with a time before the specified temporal period (e.g., stale or less relevant information). In some embodiments, each record can be filtered in a slightly different way. A record can be filtered according to a user input specifying an activity or temporal period. In some embodiments, the record can be filtered automatically based on a presetting (e.g., the computer can be configured to filter out all information that is more than one year old).

The computer system can frame the record by associating a label with the record. In some embodiments, the label can represent whether the entity took the specified action within the specified temporal period. For example, the computer system can associate a label of "1" or "true" if the entity took the specified action within the specified temporal period. By way of example, in the context of the cancellation of a subscription, the computer system can keep data from time period A to B (e.g., the specified temporal period) and determine whether the entity cancelled the subscription within a second time period, T. In this example, if the entity cancelled the subscription in time period T, the computer system can associate a label with the record indicating that the entity took the specified action.

At step 340, the computer system can create, for each record, a labelled example by generating one or more features associated with an entity of the plurality of entities. A feature can be any discernable way of sorting or classifying the record (e.g., average value, most recent value, most common value, etc.). In some embodiments, the computer system 340 can generate key value pairs, wherein each key value pair contains a feature and a value. For example, the computer system can generate features such as "average bill payment amount", "average income", "average number of automobiles", etc. and corresponding values such as "$670", "$73K", "2.3 cars", etc. In some embodiments, features can be associated with a time value. For example, computer system can generate features for a specified temporal period (e.g., features can be based only on the most recent values). Feature values can be represented as a continuous value (e.g., $670), as a categorical value (e.g., "Sedan" or "Coupe"), as a textual value, or as any other type of value.

In some embodiments, feature values can be classified as weighted values. For example, a household income of $73,000 can be represented as weighted value of {0.27 0}, {0.73 100000}. In some embodiments, the labelled example can include the key value feature pairs and the record label (e.g., whether the entity took the specified action).

At step 350, the computer system can select a subset of the plurality of labelled examples to train a model. In some embodiments, the subset can be created by randomly sampling the plurality of labelled examples. A random sample can allow for broader generalization of the model created at step 360. In some embodiments, the user can select the subset of labelled examples. For example, the user can select all entities with a particular feature (e.g., all households with at least 2 cars). In some embodiments, the subset can be created by sampling labelled examples with a wide range of values for features that are known to be more important (e.g., change in income).

At step 360, the computer system can train a model using the subset of labelled examples. For example, the model can be trained by generalizing a function that maps inputs (e.g., the one or more features) to outputs (e.g., the label, such as whether the specified action occurred). In some embodiments, the model can perform regressions for each feature simultaneously. In some embodiments, the model can be trained by a hyperparameter optimization algorithm. In some embodiments, the hyperparameter optimization algorithm can perform a grid search through a hyperparameter space for the optimal hyperparameters. In some embodiments, the hyperparameter algorithm can perform a random search through the hyperparameter space. The computer system can evaluate the hyperparameters against a holdout set of labelled examples. For example, the computer system can apply the model trained by hyperparameter optimization to the holdout set. In some embodiments, the computer system can retrain the model with different hyperparameters if a particular attribute (e.g., accuracy, area under the curve, log-likelihood, F1-score, Top N, etc.) of the model does not exceed a predetermined threshold. In some embodiments, the computer system can continue to retrain the model until it obtains hyperparameters that exceed the threshold value. In some embodiments, the computer system can train the model a predetermined number of times (e.g., 10). The computer system can evaluate the trained models against a holdout set and select the model with the most favorable attributes (e.g., accuracy, area under the curve, log-likelihood, F1-score, Top N, etc.).

At step 370, the computer system can output the model. In some embodiments, the model can be outputted to a user for future use. For example, a user can use the model to determine the propensity of an entity to take a specified action. In other embodiments, the computer system can output the model to be stored locally or to be transmitted to an external database. In some embodiments, the computer system can output the model for use in another method, such as the method described in FIG. 2, to determine the propensity of an entity to take a specified action. In some embodiments, the computer system can output confidence levels for the model. For example, the computer system can output the particular attribute (e.g., accuracy, area under the curve, log-likelihood, F1-score, Top N, etc.) of the model with respect to the examples in the holdout set.

Figure 4:
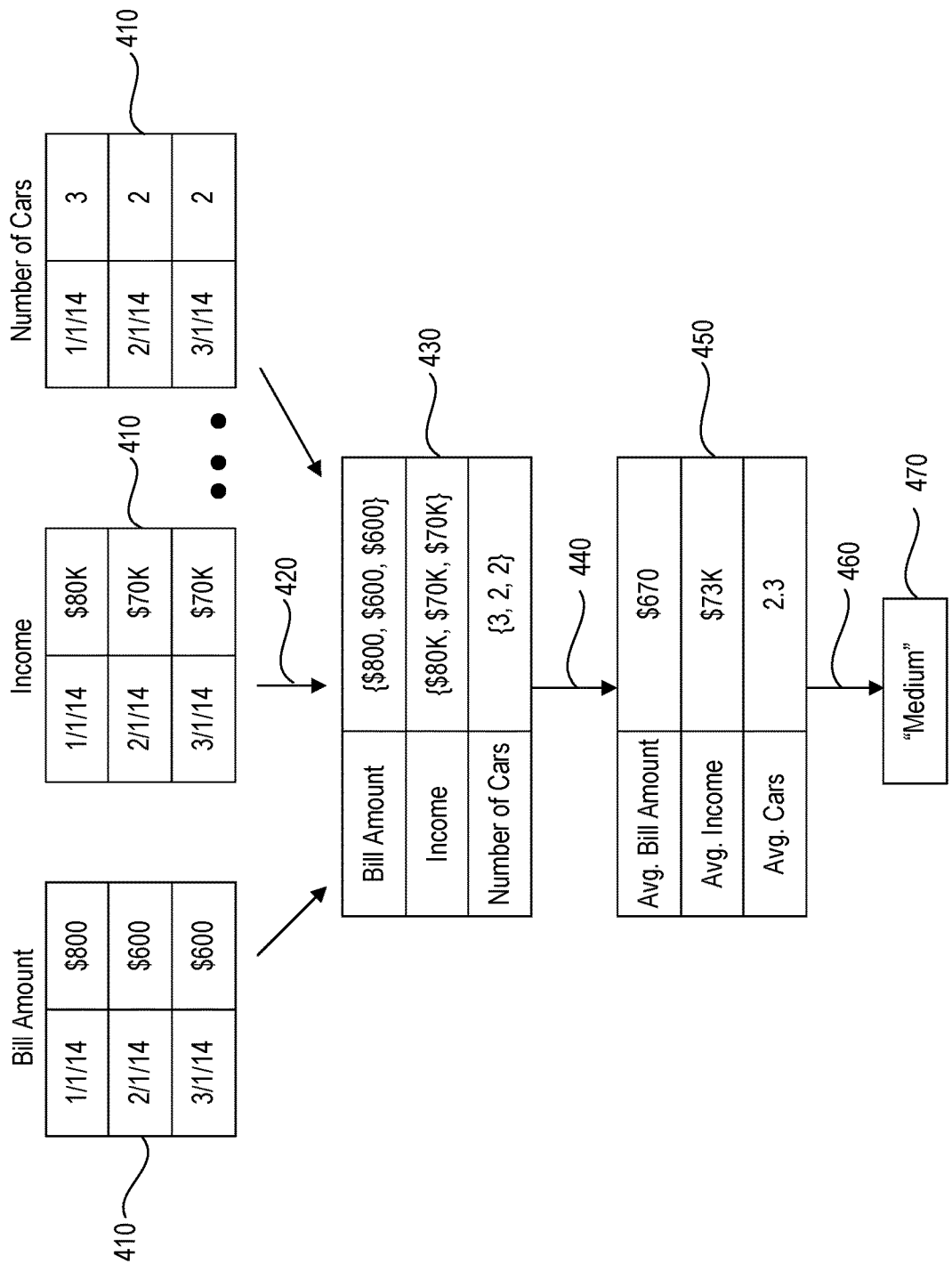
FIG. 4 provides an exemplary use case scenario for determining a propensity of an entity to take a specified action applied to an exemplary data structure, consistent with embodiments of the present disclosure.

FIG. 4 provides an exemplary use case scenario for determining a propensity of an entity to take a specified action applied to an exemplary data structure. While the flowchart discloses the following steps in a particular order, it is appreciated that at least some of the steps can be moved, modified, or deleted where appropriate, consistent with embodiments of the present disclosure. In some embodiments, the use case scenario shown in FIG. 4 can be performed by a computer system (e.g., computer system 100). It is appreciated that some of these steps can be performed in full or in part by other systems.

Referring to FIG. 4, one or more data tables 410 acquired from one or more data sources can include information associated with the entity. The one or more data tables 410 can be stored locally at the computer system and/or at one or more remote servers (e.g., such as a remote database), or at one or more other remote devices. In some embodiments, the information in the data tables can be stored in one or more multidimensional tables. By way of example, as shown in FIG. 4, information of a first type (e.g., bill payment amount) associated with the entity, (e.g., a household), can be stored in a first multidimensional table 410 and information of a second type (e.g., income or number of cars) associated with the entity can be stored in a second multidimensional table 410. In some embodiments a table can contain information associated with a single entity. For example, Bill Amount table 410 shows the most recent bill payment amounts associated with the entity in this exemplary scenario. In other embodiments (not shown), a table can store information associated with a plurality of entities. For example, each row in the table can correspond to a different entity (e.g., Household #1, Household #2, etc.) and each column in the table can correspond to a payment amount. In some embodiments, the information stored in the table can include entries associated with a temporal period. For example, a table can store a bill payment date for each bill payment amount. As shown in FIG. 4, Bill Payment Table 410 can store dates in the first column (e.g., 1/1/14, 2/1/14, and 3/1/14). Each bill payment date can be associated with the bill payment amount. For example, Bill Payment Table 410 shows that an amount of $800 was billed to the household on Jan. 1, 2014. The information can be stored as a continuous value (e.g., $800 as a bill payment amount), as a categorical value, (e.g., "Sedan" or "Coupe" as an automobile type), as textual value, or as any other type of value. In some embodiments, a table can be stored in either a row-oriented database or a column-oriented database. For example, a row in a row-oriented table can contain information associated with an entity (e.g., Household #1) and data in the row can be stored serially such that information associated with the entity can be accessed in one operation.

The computer system can form (420) a record 430 including some or all information from the one or more data sources associated with the entity. In some embodiments, record 430 can be formed (420) by integrating the information from the one or more data sources that is associated with the entity. Record 430 can contain a multitude of information related to the entity. For example, record 430 can contain all information from the one or more data sources associated with a household (e.g., number of members in household, number of automobiles, income, monthly bill mounts for each automobile, etc.). In some embodiments, record 430 can be stored as a cogroup with each row of the cogroup associated with a different category of information. In some embodiments, record 430 can be stored in either a row-oriented database or a column-oriented database. For example, a row in a row-oriented record can be associated with a data source (e.g., bill payment amount) and data in the row can be stored serially such that data associated with that data source can be accessed in one operation. As shown in FIG. 4, the "Bill Amount" is stored as row in record 430. Bill amounts $800, $600, and $600 can be stored serially such that all of the payment amounts can be accessed in one operation. Similarly, "Income" and "Number of Cars" are stored in separate rows in record 430, and information from these sources (e.g. {$80K, $70K, $70K} and {3, 2, 2}) can also be accessed in one operation.

In some embodiments, the computer system can filter record 430 for information associated with the specified action (not shown). For example, the specified action can be churn (e.g., cancellation of a subscription) and the computer system can filter record 430 for information related to churn. In some embodiments, the computer system can provide context for the specified action. In some embodiments, the computer system can determine whether the specified action will occur within a specified temporal period (e.g., one month). The computer system can filter out all information associated with a time that is outside (e.g., before or after) the specified temporal period. In some embodiments, the computer system can determine the propensity for the specified action based on only recent events. For example, the computer system can filter out information associated with a time before the specified time period (e.g., stale or less relevant information). In some embodiments, each record can be filtered in a slightly different way. Record 430 can be filtered according to a user input specifying an activity or temporal period. In some embodiments, record 430 can be filtered automatically based on a presetting (e.g., the computer can be configured to filter out all information that is more than one year old). For example, the computer system can determine the propensity of the entity to take the specified action based on only data from the previous month. In the example shown in FIG. 4, the computer system can filter out the older entries of Bill Amount table 410 (e.g., Bill Amounts of $800 and $600 corresponding to bill dates in January and February). The computer system can also filter out similar entries in Income and Number of Cars tables 410 (e.g., incomes of $80K and $70K and 3 and 2 number of cars). Thus, the computer system can use only the most recent entries to determine the propensity of the household to take the specified action (e.g., $600 in Bill Amount table 410, $70K in Income table 410, and 2 in Number of Cars table 410).

The computer system can generate (440), based on record 430, one or more features 450 associated with the entity. A feature can be any discernable way of sorting or classifying the record (e.g., average value, most recent value, most common value, etc.). In some embodiments, the computer system can generate key value pairs, wherein each key value pair contains a feature and a value. For example, the computer system can generate one or more features 450 such as "average bill payment amount", "average income", "average number of automobiles", etc. and corresponding values such as "$670", "$73K", "2.3 cars", etc. In some embodiments, the one or more features 450 can be associated with a time value. For example, computer system can generate features for a specified temporal period (e.g., features can be based only on the most recent values). Feature values can be represented as a continuous value (e.g., $670), as a categorical value (e.g., "Sedan" or "Coupe"), as a textual value, or as any other type of value. In some embodiments, the one or more feature 450 can be stored as classified as weighted values. For example, a household income of $73,000 can be represented as weighted value of {0.27 0}, {0.73 100000}.

In some embodiments, the one or more features can be extrapolated from the information contained in the record. For example, a feature can be that the entity deactivated online payments (e.g. customer deactivated ETF payment on 2/20). In some embodiments, the one or more features can be related to communications between the providing entity (e.g., insurance provider) and consuming entity (e.g., household). For example, computer system 100 can analyze (e.g., tokenize) the transcript of a call between an agent and a household and assign a topical value to that call (e.g., "topic 5" corresponding to anger). Computer system 100 can store this information as a feature pair (not shown), such as the pair {"Service Call Topic" "5"}. In some embodiments, the one or more features can be related to whether the household took a specified action (e.g., filed a claim or called to change policy).

In some embodiments, the computer system can process (460) the one or more features 450 to determine the propensity 470 of the entity to take the specified action. In some embodiments, the propensity 470 can be determined by applying a trained model, such as the model described in greater detail in FIG. 3. The input to the model can be key value pairs of the one or more features 450 associated with the entity and the specified actions and the output of the model can be the propensity 470 of the entity to take the specified action. In some embodiments, processing the one or more features associated with the entity can result in a multitude of useful insights regarding the features that influence the propensity of the entity to take the specified action. Such insights, can include, for example, the features that are most influential on the propensity of the entity to take the specified action (e.g., change in income, etc.).

In some embodiments, the computer system can output the propensity 470. In some embodiments, the computer system can output the propensity 470 as a continuous value, such as a number or percentage (e.g., 80 or 80%) or as a categorical value (e.g., "low", "medium", or "high"). In some embodiments, the computer system can generate a user interface, such as the user interfaces described in greater detail in FIGS. 5 and 6 for displaying the propensity 470.

FIG. 5 illustrates an exemplary user interface 500 provided by a computer system (e.g., computer system 100) for display (e.g., display 122), in accordance with some embodiments. User interface 500 can include a plurality of tiles (e.g., tile 510), each tile representing an entity (e.g., a household). In some embodiments, tiles can be arranged according to the propensity of the entity to take the specified action. For example, entities that are more likely to take the specified action can be located near the top of the display, whereas entities that are less likely to take the specified action can be lower on the display. As shown in FIG. 5, in some embodiments, the tiles can be arranged by date (e.g., date 520). For example, entities with the most recent activities can be located near the top of the display. By way of example, tile 510 with the most recent date 520 of Feb. 21, 2014 is located in the top left corner of the display. The tile to the right of tile 510 has the next most recent date (e.g., Feb. 20, 2014). Subsequent tiles have dates that are less recent. In other embodiments, entities with the longest pending outstanding action can be located near the top of the screen.

In some embodiments, user interface 500 can be updated periodically (e.g., once a day, once a week, once a month, etc.). In other embodiments, user interface 500 can be updated when information associated with any of the entities stored in the one or more data sources is updated (e.g., a new entry, such as payment bill amount, is added to a table). In some embodiments, user interface 500 can update in response to an input received from the user.

User interface 500 can automatically determine the entities for which to generate the display. In some embodiments, user interface 500 can display entities associated with a particular user (e.g., John Smith, Triage Agent) once the user accesses user interface 500. In some embodiments, the user can specifically identify the entities for which to generate the display. In some embodiments, the user can identity a category or class of entities for which to generate the display. For example, the user can identify a class of entities that are all consumers of a specified provisioning entity (e.g., insurance company), the user input can identify entities that are located within a specified geographic region (e.g., all households within the state of Illinois), or the user input can identify any other category of entities (e.g., all households with an income over $100,000).

In some embodiments, user interface 500 can portray a date 520 (e.g., Feb. 21, 2014) associated with the entity in tile 510. Date 520 can correspond to the current date, the date that method 200 was last performed for that entity, the date that information in the one or more data sources associated with that entity was last updated, or the date that the user last viewed the tile associated with the entity. In some embodiments, user interface 500 can portray a propensity 540 of the entity to take the specified action (e.g., "Med") in tile 510. For example, as shown in FIG. 5, user interface 500 can portray the propensity as a categorical value, such as "Med" in tile 510. In some embodiments, user interface 500 can portray tile 510 in a color (e.g., green for "low", red for "high", etc.) representing the propensity. In some embodiments, user interface 500 can portray the propensity in tile 510 as numerical value or as a percentage.

User interface 500 can portray recent activity 530 in tile 510. In some embodiments, the recent activity 530 can be entered by a user. By way of example, a recent activity could be that an "Agent called customer on 2/21 regarding discounts" as shown in tile 510. In some embodiments, user interface 500 can generate the recent activity based on the one or more features associated with the entity. For example, user interface 500 can display, "Customer registered an additional luxury vehicle on 2/18" in tile 510 responsive to this information being updated in the record associated with the entity. In some embodiments, tile 510 can portray important features 540 associated with the entity. For example, as shown in tile 510 of FIG. 5, these features can be "vehicle", "discounts", etc. In some embodiments, user interface 500 can recommend an action for the user to take (e.g., service call). In some embodiments, this recommendation can relate to the recent activity 530. A user can use this information to take preemptive action to prevent the entity from taking the specified action. By way of example, if the propensity of a household subscribing to an automobile insurance policy was high, the user could take remedial action (e.g., lower rate, contact customer to address customer concerns, etc.). In some embodiments user interface 500 can display a number uniquely identifying the entity (e.g., a policy number).

In some embodiments, user interface 500 can allow a user to click on tile 510 to access additional information associated with the entity. For example, a user can access user interface 600 shown in FIG. 6 below by clicking on one of the tiles shown in user interface 500 of FIG. 5. In some embodiments, user interface 600 can be inlaid over user interface 500. In some embodiments, user interface 600 can be a distinct user interface.

User interface 500 can also allow access to additional user interfaces (not shown) through the "INBOX," "FLAGGED," and "STATS" links shown at the top of user interface 500. The "INBOX" user interface can display messages between the user and other agents to track the remedial actions that were taken. The INBOX user interface can also be used to notify users of households with a higher likelihood of cancelling the subscription. The "FLAGGED" user interface can show customers (e.g., households) that the user believed were at risk for taking the specified action. For example, the FLAGGED user interface can contain a list of the households most likely to cancel their insurance policy. In some embodiments, these households can be selected manually by the user. In some embodiments, these households can be automatically populated if the propensity exceeds a predetermined threshold (e.g., the FLAGGED interface can be populated with all households with a "High" propensity). The FLAGGED user interface can allow the user to track remediation steps (e.g., contacting the household, changing policy, etc.). Households can remain in the FLAGGED user interface until their risk of taking the specified action has declined, the user has decided that the household is no longer at risk, or the specification action occurred (e.g., the household cancelled its subscription). The "STATS" interface can display metrics such as, for example, the rate at which the user was able to prevent the specified action from occurring categorized by action taken and the most common and/or trending issues.

FIG. 6 illustrates another exemplary user interface 600 provided by the computer system (e.g., computer system 100) for display (e.g., display 112) in accordance with some embodiments. In some embodiments, user interface 600 can be accessed by clicking on a tile (e.g., entity) in user interface 500. User interface 600 can portray a date 610 (e.g., Feb. 18, 2014) associated with the entity. Date 610 can correspond to the current date, the date that method 200 was last performed for that entity, the date that information in the one or more data sources associated with that entity was last updated, or the date that the user last viewed the tile associated with the entity. In some embodiments, user interface 600 can portray a propensity 620 of the entity to take the specified action. For example, as shown in FIG. 6, user interface 600 can portray propensity 620 as a categorical value, such as "Med.". In some embodiments, user interface 600 can convey propensity 620 by shading the top bar in a different color (e.g., green for "low", red for "high", etc.) representing propensity 620. In some embodiments, user interface 600 can portray propensity 620 as numerical value or as a percentage. In some embodiments user interface 600 can display the entity status 630 (e.g., "Active" if the household is currently subscribing to a policy).

In some embodiments, user interface 600 can display recent activities 640 associated with the entity. For example, as shown in FIG. 6, user interface 600 can display that the "customer registered an additional luxury vehicle on 2/18". User interface 600 can recommend an action 650 for the user to take (e.g., service call). In some embodiments, this recommendation 650 can relate to the recent activity.

User interface 600 can provide the user with additional information associated with the entity. As shown in the bottom left panel of FIG. 6, user interface 600 can display basic biographic information 660 for the entity. In the automobile insurance context, for example, user interface 600 can display the policy number, (e.g., 34726182), the entity name (e.g., household/owner of the policy, David Stark), the policy coverage start date (e.g., Dec. 12, 2004), any secondary owners associated with the policy (e.g., James Watson), information associated with the insured automobile (e.g., 2013 Cadillac Escalade), and the type of insurance policy (e.g., Standard).

In some embodiments, user interface 600 can also display information for an agent 670 associated with the entity. For example, the user interface 600 can display the name (e.g., Bruce Atherton) and contact information (e.g., 583 234-9172) of the agent. A user can use this information to take preemptive action to prevent the entity from taking the specified action. By way of example, if the propensity of churning for a household subscribing to an automobile insurance policy was high, the user could contact the agent to take remedial action (e.g., lower rate, address customer concerns, etc.).

In some embodiments, the right panel of FIG. 6, can display recent events 680 associated with the entity. For example, user interface 600 can display whether the entity status is active (e.g., whether the entity is currently subscribing to a policy) or whether the agent has taken any actions (e.g., called the household or subscriber). In some embodiments, user interface 600 can also allow the user and agent to converse in the right panel. For example, the user can click on the "ADD AN UPDATE" button 690 to remind the agent to contact the entity. The user interface can display responsive comments 680 from the agent and the agent can add any actions taken 680 (e.g., calling the household).

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system comprising:
   one or more processors; and
   memory storing instructions that, when executed by the one or more processors, cause the system to:
      generate a plurality of records associated with a plurality of entities by integrating information from one or more data sources, each of the plurality of records associated with a corresponding entity of the plurality of entities and comprising a plurality of data entries from a specific data source of the one or more data sources, wherein each of the plurality of records stores the plurality of data entries serially;
      filter the plurality of records for a subset of the information associated with a specified action and a specified temporal period;
      generate, based on the filtering, a record label for each of the plurality of records;
      generate a key-value pair for each of the plurality of records, wherein the key-value pair comprises a feature and a corresponding value;
      create a set of training data items, each training data item of the set of the training data items comprising a corresponding key-value pair of the generated key-value pairs and a corresponding record label of the generated record labels;

selecting a subset of the created training data items; and constructing a model using the subset of the training data items, wherein the model is implemented to predict or infer one or more attributes of any entities among the plurality of entities or among a plurality of second entities.

2. The system of claim 1, wherein the feature indicates a deactivation of an activity.

3. The system of claim 1, wherein the feature is related to a communication between two entities.

4. The system of claim 3, wherein the corresponding value is indicative of an emotion relating to the communication.

5. The system of claim 1, wherein the instructions further cause the system to:

determine a propensity for an entity to take an action based on the generated key-value pair.

6. The system of claim 5, wherein the instructions further cause the system to:

output, as a categorical value, the propensity for the entity to take the action on an interface.

7. The system of claim 5, wherein the instructions further cause the system to:

output, as a numerical value, the propensity for the entity to take the action on an interface.

8. A method comprising:

obtaining information associated with a plurality of entities from one or more data sources;

forming a plurality of records associated with the plurality of entities by integrating the information from the one or more data sources, each of the plurality of records associated with a corresponding entity of the plurality of entities and comprising a plurality of data entries from a specific data source of the one or more data sources, wherein each of the plurality of records stores the plurality of data entries serially;

filtering the plurality of records for a subset of the information associated with a specified action and a specified temporal period;

generating, based on the filtering, a record label for each of the plurality of records;

generating a key-value pair for each of the plurality of records, wherein the key-value pair comprises a feature and a corresponding value;

creating a set of training data items, each training data item of the set of the training data items comprising a corresponding key-value pair of the generated key-value pairs and a corresponding record label of the generated record labels;

selecting a subset of the created training data items; and constructing a model using the subset of the training data items, wherein the model is implemented to predict or infer one or more attributes of any entities among the plurality of entities or among a plurality of second entities.

9. The method of claim 8, wherein the feature indicates a deactivation of an activity.

10. The method of claim 8, wherein the feature is related to a communication between two entities.

11. The method of claim 10, wherein the corresponding value is indicative of an emotion relating to the communication.

12. The method of claim 8, further comprising:

determining a propensity for an entity to take an action based on the generated key-value pair.

13. The method of claim 12, further comprising:

outputting, as a categorical value, the propensity for the entity to take the action on an interface.

14. The method of claim 12, further comprising:

outputting, as a numerical value, the propensity for the entity to take the action on an interface.

15. A non-transitory computer-readable medium storing a set of instructions that are executable by one or more processors to cause the one or more processors to perform:

obtaining information associated with a plurality of entities from one or more data sources;

forming a plurality of records associated with the plurality of entities by integrating the information from the one or more data sources, each of the plurality of records associated with a corresponding entity of the plurality of entities and comprising a plurality of data entries from a specific data source of the one or more data sources, wherein each of the plurality of records stores the plurality of data entries serially;

filtering the plurality of records for a subset of the information associated with a specified action and a specified temporal period;

generating, based on the filtering, a record label for each of the plurality of records; and generating a key-value pair for each of the plurality of records, wherein the key-value pair comprises a feature and a corresponding value;

creating a set of training data items, each training data item of the set of the training data items comprising a corresponding key-value pair of the generated key-value pairs and a corresponding record label of the generated record labels;

selecting a subset of the created training data items; and constructing a model using the subset of the training data items, wherein the model is implemented to predict or infer one or more attributes of any entities among the plurality of entities or among a plurality of second entities.

16. The non-transitory computer-readable medium of claim 15, wherein the feature indicates a deactivation of an activity.

17. The non-transitory computer-readable medium of claim 15, wherein the feature is related to a communication between two entities.

18. The non-transitory computer-readable medium of claim 17, wherein the corresponding value is indicative of an emotion relating to the communication.

19. The non-transitory computer-readable medium of claim 15, wherein the instructions further cause the system to perform:

determining a propensity for an entity to take an action based on the generated key-value pair.

20. The non-transitory computer-readable medium of claim 19, wherein the instructions further cause the system to perform:

outputting, as a categorical value, the propensity for the entity to take the action on an interface.

* * * * *